United States Patent
Maniloff

(10) Patent No.: US 9,806,801 B2
(45) Date of Patent: Oct. 31, 2017

(54) IN-SERVICE OPTICAL FAULT ISOLATION SYSTEMS AND METHODS

(71) Applicant: Ciena Corporation, Hanover, MD (US)

(72) Inventor: Eric Maniloff, Stittsville (CA)

(73) Assignee: Ciena Corporation, Hanover, MD (US)

( * ) Notice: Subject to any disclaimer, the term of this patent is extended or adjusted under 35 U.S.C. 154(b) by 7 days.

(21) Appl. No.: 14/930,810

(22) Filed: Nov. 3, 2015

(65) Prior Publication Data

US 2017/0126312 A1 May 4, 2017

(51) Int. Cl.
| | |
|---|---|
| *H04B 10/08* | (2006.01) |
| *H04B 10/038* | (2013.01) |
| *H04B 10/079* | (2013.01) |
| *H04Q 11/00* | (2006.01) |
| *H04L 12/24* | (2006.01) |
| *H04B 10/077* | (2013.01) |

(52) U.S. Cl.
CPC ....... *H04B 10/038* (2013.01); *H04B 10/0791* (2013.01); *H04L 41/0677* (2013.01); *H04Q 11/0066* (2013.01); *H04B 10/0771* (2013.01); *H04Q 2011/0081* (2013.01); *H04Q 2011/0083* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,184,081 | A | * | 2/1993 | Oswald ................ G01R 31/083 324/532 |
| 7,106,979 | B1 | | 9/2006 | Taylor |
| 7,155,128 | B2 | | 12/2006 | Roberts et al. |
| 7,305,183 | B2 | | 12/2007 | Roberts et al. |
| 7,693,357 | B2 | | 4/2010 | El Fellah et al. |
| 7,693,359 | B2 | | 4/2010 | Murphy et al. |
| 7,756,421 | B2 | | 7/2010 | Roberts et al. |
| 8,233,755 | B2 | | 7/2012 | Murphy et al. |
| 8,345,238 | B2 | | 1/2013 | Yao |
| 8,364,036 | B2 | | 1/2013 | Boertjes et al. |
| 8,594,499 | B1 | | 11/2013 | Roberts et al. |
| 8,958,696 | B2 | | 2/2015 | Boertjes et al. |

(Continued)

OTHER PUBLICATIONS

Mukherjee, Biswanath, Optical WDM Networks, 2006, Springer Science+Business Media, Inc., pp. 234-237.*

(Continued)

*Primary Examiner* — Ken N Vanderpuye
*Assistant Examiner* — Jai Lee
(74) *Attorney, Agent, or Firm* — Clements Bernard Walker PLLC; Christopher L. Bernard; Lawrence A. Baratta, Jr.

(57) ABSTRACT

Systems and methods for in-service optical fault isolation on a link between a first node and a second node include transmitting counters between each of the first node and the second node; determining associated values for the counters responsive to an event associated with the link; and determining a location of the event based on the associated values for the counters. The determining includes converting time differences between the counters into distance, based on propagation speed of a signal over optical fiber forming the link. The location is determined in-service based on a single occurrence of the event without external equipment.

17 Claims, 3 Drawing Sheets

(56) References Cited

U.S. PATENT DOCUMENTS

| | | | |
|---|---|---|---|
| 9,002,197 B2* | 4/2015 | Dahlfort | H04L 43/0811 |
| | | | 398/13 |
| 9,164,065 B2* | 10/2015 | Hood | G01N 29/14 |
| 9,178,755 B2* | 11/2015 | Dahlfort | H04B 10/0771 |
| 9,337,921 B2* | 5/2016 | Alfiad | H04B 10/0775 |
| 9,432,144 B2* | 8/2016 | Gareau | H04B 10/27 |
| 2003/0048813 A1* | 3/2003 | Lahav | H04J 3/1611 |
| | | | 370/537 |
| 2009/0003837 A1* | 1/2009 | Piciaccia | H04B 10/0775 |
| | | | 398/158 |
| 2012/0224846 A1* | 9/2012 | Swanson | H04B 10/0705 |
| | | | 398/13 |
| 2013/0051809 A1 | 2/2013 | Mehrvar et al. | |
| 2014/0112660 A1 | 4/2014 | Al Sayeed et al. | |
| 2014/0328583 A1 | 11/2014 | Al Sayeed et al. | |
| 2014/0376905 A1* | 12/2014 | Fludger | H04B 10/073 |
| | | | 398/13 |
| 2015/0131988 A1 | 5/2015 | Alfiad et al. | |

OTHER PUBLICATIONS

Qin et al., "New method for lightning location using optical ground wire," Chinese Optic Letters, vol. 4, No. 12, Dec. 10, 2006, pp. 712-714.

Kozlov et al., "Nonlinear repolarization dynamics in optical fibers: transient polarization attraction," HAL Archives-Ouvertes, Nov. 7, 2011, pp. 1-40.

Kramer et al., "Fiber Optic Sensor Network for Lightning Impact Localization and Classification in Wind Turbines," 2006 IEEE International Conference on Multisensor Fusion and Integration for Intelligent Systems, Sep. 3-6, 2006, pp. 1-6.

Reimer, "Simulation Methods for the Temporal and Frequency Dynamics of Optical Communication Systems," A thesis presented to the University of Waterloo in fulfilment of the thesis requirement for the degree of Doctor of Philosophy in Physics, 2012, pp. 1-199.

Guasoni et al., "Fast and Chaotic Fiber-Based Nonlinear Polarization Scrambler," pp. 1-11.

* cited by examiner

IN-SERVICE OPTICAL FAULT ISOLATION SYSTEMS AND METHODS

FIELD OF THE DISCLOSURE

The present disclosure generally relates to optical networking systems and methods. More particularly, the present disclosure relates to in-service optical fault isolation systems and methods.

BACKGROUND OF THE DISCLOSURE

Conventionally, detection of events in optical networks is isolated on a per span basis. As described herein, events include, without limitation, fiber cuts, fiber pinches, poor fiber splices, polarization transients, changes in optical power, change in Signal to Noise Ratio (SNR), etc. That is, an event is anything that causes degradation (e.g., bit errors, loss of polarization tracking, etc.) or loss in an optical signal (e.g., Loss of Frame (LOF), Loss of Signal (LOS), etc.). Once a specific span is identified for an event, isolation along the span, to a specific location, is time-consuming, costly, and often requires subsequent occurrences of the event for detection. Conventional techniques also require external equipment (e.g., Optical Time Domain Reflectometers (OTDRs), etc.) and do not operate in-service (i.e., where the event is a degradation or is transient in nature). For polarization transients, conventional techniques require external monitoring equipment, using an out of service wavelength, then waiting for an additional event. In some cases, there may be significant and/or random delay between events.

Thus, it would be advantageous to have an in-service optical fault isolation systems and methods that can detect and determine the distance to associated events, based on initial occurrences.

BRIEF SUMMARY OF THE DISCLOSURE

In an exemplary embodiment, a method for in-service optical fault isolation on a link between a first node and a second node includes transmitting counters between each of the first node and the second node; determining associated values for the counters responsive to an event associated with the link; and determining a location of the event based on the associated values for the counters. The determining can include converting time differences between the counters into distance, based on propagation speed of a signal over optical fiber forming the link. The counters can be provided in Optical Transport Network frames and incremented for each frame. The counters can include a bit resolution based on a maximum distance between the first node and the second node. The location can be determined in-service based on a single occurrence of the event without external equipment. The counters can include a counter CNT_A transmitted from the first node to the second node and a counter CNT_B transmitted from the second node to the first node, wherein the associated values are 1) N_A for the counter CNT_A when the event occurs, 2) N_B for the counter CNT_B when the even occur, 3) M_A for the counter CNT_A when the first node receives N_B for the counter CNT_B, and 4) M_B for the counter CNT_B when the second node receives N_A for the counter CNT_A and M_A and M_B are incremented by a maximum counter value+1 if they are less than their corresponding values N_A and N_B and wherein a time T_A from the event to the first node is (M_A−N_A)*Frame Time/2 and a time T_B from the event to the second node is (M_B−N_B)*Frame Time/2. The event can be any of fiber cuts, fiber pinches, poor fiber splices, polarization transients, changes in optical power, change in Signal to Noise Ratio (SNR), and Bit Error Rate (BER) change. The method can be performed by one of the first node and the second node, subsequent to providing the associated counters between the first node and the second node. The method can be performed by a server, subsequent to providing the associated counters from the first node and the second node to the server.

In another exemplary embodiment, an apparatus configured to isolate an optical fault on a link between a first node and a second node includes a network interface; a processor communicatively coupled to the network interface; and memory storing instructions that, when executed, cause the processor and the network interface to receive data via the network interface related to counters maintained at each of the first node and the second node, wherein the data relates to values of the counters associated with an event on the link, and determine a location on the link of the event based the values of the counters. The location can be determined based on converting time differences between the values into distance, based on propagation speed of a signal over optical fiber forming the link. The counters can be provided in Optical Transport Network frames and incremented for each frame. The counters can include a bit resolution based on a maximum distance between the first node and the second node. The location can be determined in-service based on a single occurrence of the event without external equipment. The counters can include a counter CNT_A transmitted from the first node to the second node and a counter CNT_B transmitted from the second node to the first node, wherein the associated values are 1) N_A for the counter CNT_A when the event occurs, 2) N_B for the counter CNT_B when the even occur, 3) M_A for the counter CNT_A when the first node receives N_B for the counter CNT_B, and 4) M_B for the counter CNT_B when the second node receives N_A for the counter CNT_A and M_A and M_B are incremented by a maximum counter value+1 if they are less than their corresponding values N_A and N_B, and wherein a time T_A from the event to the first node is (M_A−N_A)*Frame Time/2 and a time T_B from the event to the second node is (M_B−N_B)*Frame Time/2.

In a further exemplary embodiment, a node configured to isolate an optical fault in-service on a link connected to a second node includes a line port; and a controller communicatively coupled to the line port, wherein the controller is configured to maintain a local counter and transmit associated values of the local counter to the second node in a signal over the line port, detect an event in a frame on the signal and determine a value of a remote counter in the frame over the line port, determine a value of the local counter when the frame is received over the line port, and one of i) receive a value of the local counter of the second node in the frame and determine a distance to the event and ii) provide the value of the remote counter and the value of the local counter when the frame is received to an external device configured to determine the distance. The distance can be determined based on converting time differences of counters into distance, based on propagation speed of a signal over optical fiber forming the link. The frame can be an Optical Transport Network frame and the associated values of the local counter are incremented for each frame. The location can be determined in-service based on a single occurrence of the event without external equipment. The local counter can be a counter CNT_A and the remote counter is CNT_B, wherein the value of the local counter when the frame is received over the line port is M_A, wherein the value of the local counter received by the second node in the frame is N_A, and wherein the value M_A is increased by the maximum counter value+1 if M_A<N_A, and wherein a time T_A from the event to the node is (M_A−N_A)*Frame Time/2, providing resolution of the distance based on the Frame Time.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of an apparatus which can be used for the server in FIG. 1, the controller in the node of FIG. 3, a Path Computation Element (PCE), a planning tool, or the like.

DETAILED DESCRIPTION OF THE DISCLOSURE

Figure 1:
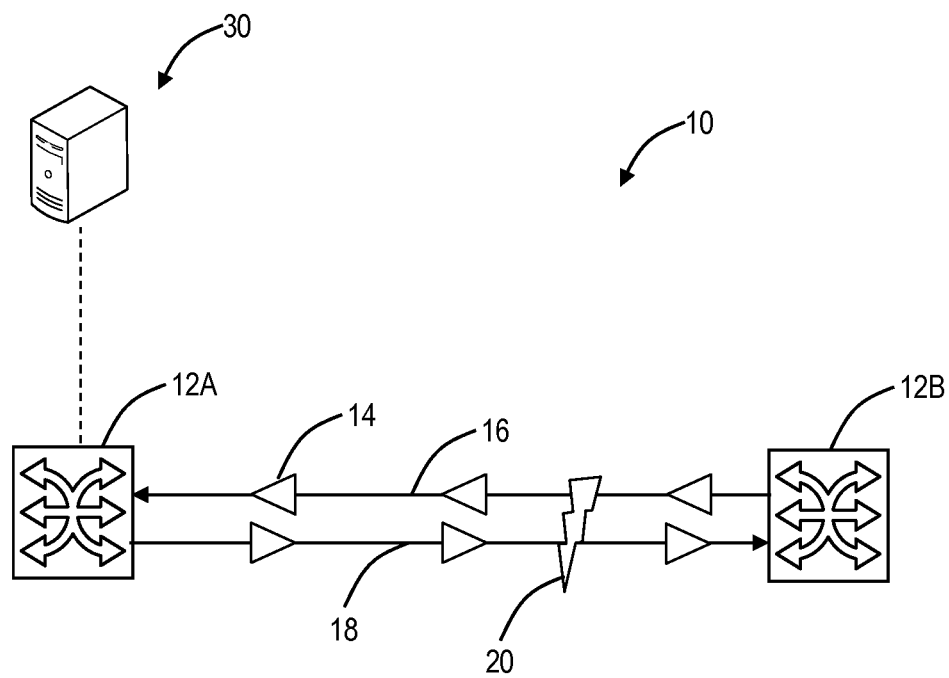
FIG. 1 is a network diagram of a network with two nodes and intermediate optical amplifiers interconnected by fibers.

In various exemplary embodiments, in-service optical fault isolation systems and methods are described. The systems and methods isolate a location of an event on an optical line, through a digital implementation such as using counters in overhead bytes. The systems and methods operate in-service to isolate the location of traffic-impacting events, and individual faults can be localized without the need to use additional external test equipment, or to wait for a subsequent event. A counter is implemented at each endpoint of an optical link, i.e., the endpoints being nodes or network elements. These counters increment with each frame, and have sufficient bits to allow measurement of a time delay corresponding to any practical optical link (i.e., >10,000 km). The time resolution is limited to the frame time, approx. 1 μs for Optical channel Transport Unit-4 (OTU4), allowing for isolation of a fault location to within hundreds of meters. For faster frame rates, such as those implemented in some Forward Error Correction (FEC) schemes, more accurate resolution is available. With the counter times noted based on an event or fault, distance can be determined based on propagation speed over optical fiber.

Advantageously, the systems and methods use a simple counter, incremented for each frame, to isolate quickly and easily a fault location to within hundreds of meters in-service. This is a novel and important capability, especially in high-speed coherent optical systems. In service fault location determination is also advantageous, as is the ability to locate the location of an event without external test equipment or signals. Also, the systems and methods can isolate the fault location from an individual event, without requiring or waiting for additional line events. The systems and methods can operate in service to immediately isolate the location of transient events that can lead to traffic impacts. The systems and methods perform end-to-end monitoring, covering an entire optical link between two optical add/drop locations and including intermediate amplifiers. The systems and methods can be used on their own or in conjunction with external equipment which can be used for finer granularity detection or to determine the event type if needed.

Again, events include, without limitation, fiber cuts, fiber pinches, poor fiber splices, polarization transients, changes in optical power, change in Signal to Noise Ratio (SNR), etc. In high-speed coherent optical lines, State of Polarization (SOP) transients can cause traffic disruptions. These transients can be random, external events such as for example, mechanical vibrations, weather, etc. The systems and methods can isolate these transient events quickly and immediately, without requiring subsequent occurrences. The systems and methods can be running at all times, rather than after an event has occurred. Specifically, the systems and methods only require a sequential counter, implemented in somewhere in a data frame that is transmitted between two nodes. In one exemplary embodiment, the sequential counter is a 16-bit counter to support a fiber link of over 7500 km. The reach can be extended by either adding additional bits to the counter, or by incrementing the counter less frequently than once per frame. The systems and methods can locate an event occurring in both directions of an optical link simultaneously. This covers faults such as fast polarization transients and fiber cuts. The systems and methods can generally be used to detect any type of link event, i.e., a network operator could program their own metrics that they wish to isolate in the line. In the descriptions herein, the systems and methods describe using Optical Transport Network (OTN) and specifically an Optical channel Transport Unit-4 (OTU4) as an example, but those of ordinary skill in the art will appreciate the systems and methods could apply to any protocol allowing for transmission of counters.

Exemplary Optical Network

Referring to FIG. 1, in an exemplary embodiment, a network diagram illustrates a network 10 with two nodes 12A, 12B and intermediate optical amplifiers 14 interconnected by fibers 16, 18. Of course, those of ordinary skill in the art will recognize the network 10 can include additional nodes, fibers, optical components, etc. which are omitted for illustration purposes. The network 10 is merely a point-to-point optical network with the two nodes 12A, 12B; of course, other networks may include mesh, rings, spurs, and combinations thereof. The nodes 12A, 12B can be any type of optical network element including, without limitation, Wavelength Division Multiplexing (WDM) terminals, Reconfigurable Optical Add/Drop Multiplexers (ROADMs), Optical Add/Drop Multiplexers (OADMs), switches, routers, cross-connects, etc. In an exemplary embodiment, the nodes 12A, 12B have optical transceivers or modems which connect to one another over the fibers 16, 18.

For example, each optical transceiver or modem can be configured to use any of duobinary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. Furthermore, with Digital Signal Processing (DSP) and software programming, the capacity of the modems can be adjusted upwards or downwards in a hitless manner so as not to affect the guaranteed rate. Additionally the modems can tune and arbitrarily select spectrum; thus no optical filters are required. Additionally, the modems can support various aspects of nonlinear effect mitigation and dispersion compensation (both for chromatic and polarization mode) in the electrical domain, thus eliminating external dispersion compensation devices, filters, etc. The modems can also utilize Forward Error Correction (FEC) coding.

Additionally, various protocols are configured to operate over the optical transceiver or modems, such as OTN, Synchronous Optical Network (SONET), Synchronous Digital Hierarchy (SDH), Ethernet, and the like. These protocols all support digital transmission and support the ability to include counters between the nodes 12A, 12B. With digital performance monitoring (Operations, Administration, Maintenance, and Provisioning (OAM&P)), it is possible to isolate events to specific spans, e.g., between the nodes 12A, 12B. Unfortunately, this is on the order of kilometer resolution at best, or potentially only to a specific span which can be over 100 km. It is not possible to physically troubleshoot an event with only kilometer resolution.

Note, the nodes 12A, 12B communicate bidirectionally with one another, i.e., the node 12A transmits to the node 12B over the fiber 16 and the node 12B transmits to the node 12A over the fiber 18. Thus, an event 20 acting on the fibers 16, 18 will cause an errors, transients, signal loss, etc. that are experienced on both the fibers 16, 18. Note, for an example, SOP transient, this may not cause the same exact SOP changes on the different fibers 16, 18, but the overall form will be similar. Note, the fibers 16, 18 can be said to be substantially collocated with one another, i.e., located in a bundle together, traveling along the same geographic route in a conduit, as overhead cable, etc. Of course, the fibers 16, 18 may have different paths inside a Central Office (CO) or the like, e.g., with different cabling from a Fiber Distribution Frame, etc. The substantially collocated means the fibers 16, 18, for the most part, traverse a similar path between sites. Also, while the fibers 16, 18 are shown in a unidirectional transmission scheme, the systems and methods can also operate with the bidirectional transmission on the same fiber.

The network 10 can also include a server 30 communicatively coupled to the nodes 12A, 12B. The server 30 can be a Network Management System (NMS), Element Management System (EMS), Operations Support System (OSS), Craft Interface (CI), Software Defined Networking (SDN) controller, Path Computation Element (PCE), etc. Also, the nodes 12A, 12B can include integrated processing equipment, providing similar functionality to the server for OAM&P. The in-service optical fault isolation described herein generally has counters exchanged between the nodes 12A, 12B and processing performed either at the nodes 12A, 12B and/or the server 30 to determine a location of the event 20.

In an exemplary embodiment, a process for in-service optical fault isolation on a link between the nodes 12A, 12B includes transmitting counters between each of the nodes 12A, 12B; determining associated values for the counters responsive to the event 20 associated with the link; and determining a location of the event 20 based on the associated values for the counters. As described herein, the determining includes converting time differences between the counters into the distance, based on propagation speed of a signal over optical fiber forming the link. In another exemplary embodiment, the server 30 is configured to isolate an optical fault on a link between the nodes 12A, 12B. The server 30 includes a network interface; a processor communicatively coupled to the network interface; and memory storing instructions that, when executed, cause the processor to receive data related to counters maintained at each of the nodes 12A, 12B, wherein the data relates to values of the counters associated with an event on the link, and determine a location on the link of the event based the values of the counters.

The systems and methods can utilize high-level control software through the nodes 12A, 12B and/or the server 30, with an ability to program and monitor for various event types. The systems and methods are applicable to events impacting both directions of the link simultaneously, such as polarization events, fiber cuts. In the simplest implementation, a fault would simply be an uncorrected FEC block, however the same approach can be used to trigger on events that are not severe enough to cause a traffic impact, such as abrupt power, Bit Error Rate (BER), or polarization changes.

The nodes 12A, 12B track their own local counter as well as a received counter from the other node. Upon reception of the event 20, each node 12A, 12B captures both its local counter and the received counter values. Thus, when the event 20 occurs, each of the nodes 12A, 12B notes the received counter value from a frame which is used to detect the event 20 and the local counter value at the same time the received counter value is received. From these four counter values, it is possible to determine time differentials between the event 20 occurring and the nodes 12A, 12B detecting the event 20. These time differentials can be converted into the distance to isolate the location of the event 20.

In-Service Optical Fault Isolation Process

Figure 2:
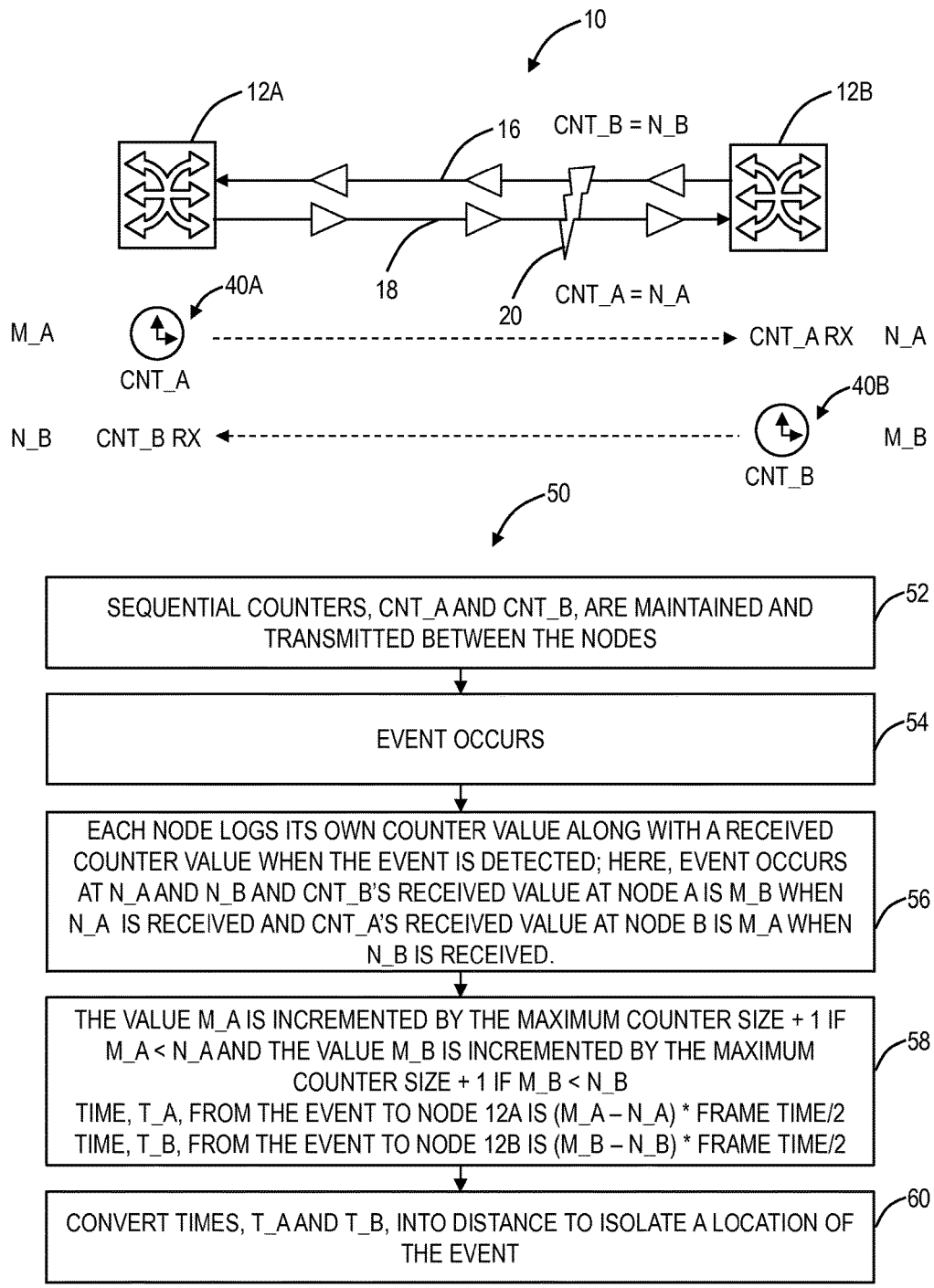
FIG. 2 is a network diagram and a flowchart of an in-service optical fault isolation process for the network.

Referring to FIG. 2, in an exemplary embodiment, a network diagram and a flowchart illustrate an in-service optical fault isolation process 50 for the network 10. The in-service optical fault isolation process 50 includes maintenance of sequential counters 40A, 40B at each of the nodes 12A, 12B (counter 40A (CNT_A) at the node 12A, counter 40B (CNT_B) at the node 12B) and transmission of the counters between the nodes 12A, 12B (step 52). As described herein, the counters 40A, 40B can be transmitted in OTN frames, such as in OTU or Optical channel Data Unit (ODU) overhead (e.g., ODU Tandem Connection Monitoring (TCM) fields). For example, unused overhead can be used to implement the counters 40A, 40B and transition bits. In OTN, exemplary options include 8 bit of OTU reserved overhead, 16 bits Experimental (EXP) overhead or Reserved (RES) ODU OH, unused TCM bytes, etc. In an exemplary embodiment, TCM bytes can be used. The counters 40A, 40B run independently at each of the nodes 12A, 12B and increment in each frame. For an OTU4, the frame time is about 1.17 μs, and a 16 bit counter would cycle every 76.5 ms, essentially an extended Multiframe Alignment Signal (MFAS). With OTU4, the maximum delay available from 16 bits corresponds to approximately 15,000 km round trip, or 7500 km from the terminal to the fault which should be sufficient for terrestrial links. An additional bit added to the counter would double the distance covered by this measurement. That is, the number of bits in the counters 40A, 40B is determined based on the frame time and the maximum reach of a link. The number of bits needs to be sufficient to account for round-trip propagation time over the link.

Next, the event 20 occurs (step 54). Again, the event can be anything on the link from a minor issue to a fiber cut. When the event 20 is detected, each node 12A, 12B logs its own counter value along with a received counter value at the event time (step 56). Here, the value of the counter 40A CNT_A at the location of the event 20 is at time N_A and the value of the counter 40B CNT_B at the location of the event 20 is at time N_B at the time of the event 20. Also, counter 40A CNT_A is at time M_A when the counter 40B CNT_B is received with the time N_B and the counter 40B CNT_B is at time M_B when the counter 40A CNT_A is received with the time N_A. Thus, each node 12A, 12B notes its local counter time when the counter times N_A, N_B which correspond to detection of the event 20 in the associated frame.

The number of cycles that each counter has incremented between the frame at which the event 20 occurs, N_A and N_B, and the time at which the second value is recorded, M_A and M_B is used to calculate the time of flight between the endpoints and the event location. Since the counters may exceed their maximum value during the counting process, if the second counter value recorded, i.e., M_A, M_B, is less than the first value recorded this indicates that the counter has passed through its maximum value during the recording. In this event, the second counter value recorded is incremented by the maximum counter value+1, or 2^(counter size in bits).

The time delay between the counter values N_A, N_B, M_A, M_B is used to determine the time of flight from the nodes 12A, 12B to the event 20. Specifically, the round trip time from node 12A to the event and back to node 12A is (M_A−N_A)*Frame time. The time, T_A, from the event 20 to the node 12A is (M_A−N_A)*Frame time/2 and time, T_B, from the event 20 to the node 12B is (M_B−N_B) *Frame time/2 (step 58). Note, the times T_A, T_B combined should be equal to the total time of flight between the nodes 12A, 12B. Finally, the times T_A, T_B can be converted to a distance to isolation a location of the event 20 (step 60). Specifically, since the propagation speed of light is a known factor, the times T_A, T_B can be converted to distance based on the known propagation speed.

Note, the node 12A is configured to detect the counter values M_A and N_B and the node 12B is configured to detect the counter values M_B and N_A. Subsequent to the event and the detection, the node 12A can communicate the value N_B to the node 12B and the node 12B can communicate the value N_A to the node 12A, since each of the nodes 12A, 12B need the respective values N_A, N_B for the determination. Alternatively, each of the nodes 12A, 12B can provide the counter values N_A, N_B, M_A, M_B to the server 30 for determination thereon. Of course, the exchange of these values can be in-band using OTN overhead or the like or out-of-band using an external Data Communications Network (DCN).

Time to Distance Calculations

To perform the conversion of the times T_A, T_B into the distance, the speed of a signal needs to be determined over the fibers 16, 18. The index of refraction (or refractive index) is a way of measuring the speed of light in a material. Light travels fastest in a vacuum, such as in outer space. The speed of light in a vacuum is about 300,000 kilometers per second (or more precisely 299,792,458 m/s). The refractive index of a medium is calculated by dividing the speed of light in a vacuum by the speed of light in that medium. The refractive index of a vacuum is therefore 1, by definition. A typical single-mode fiber used for telecommunications has a cladding made of pure silica, with an index of 1.444 at 1500 nm, and a core of doped silica with an index around 1.4475. The larger the index of refraction, the slower light travels in that medium. From this information, a simple rule of thumb is that a signal using the fibers 16, 18 for communication will travel at around 200,000 kilometers per second (or more precisely 207,110,506 m/s which is 299,792,458 m/s divided by 1.4475). For purposes of a time to distance calculation, in step 60, the 200,000 km/s can be changed to 5 μs/km (for the foregoing descriptions, the actual value used is 4.9 μs/km which is a bit more accurate). This 4.9 μs/km can be referred to as a time-to-distance conversion factor. Those of ordinary skill in the art will recognize it is possible to calculate the time-to-distance conversion factor for different types of fiber, as described herein.

Assume, for an example, the time T_A is 200 μs. The fiber distance from the event 20 to the node 12A is:

$$\text{Distance} = \frac{200 \ \mu s}{4.9 \ \mu s} \text{km} = \sim 40.8 \ \text{km}$$

A generalized formula to determine the distance of the event 20 to the node 12A given the time T_A is as follows:

$$\text{Distance} = \frac{T\_A}{TD \ \text{conversion}} \text{km}$$

where TD conversion is the time-to-distance conversion factor, i.e., 4.9 μs. Of course, the same formula can be used to determine the distance of the event 20 to the node 12B by changing the time T_A above to the time T_B. Note, the two distances to the event 20 should be equal to the overall distance between the nodes 12A, 12B.

The systems and methods are accurate to within a single frame. In the case of an OTU4, the systems and methods have an accuracy of within 250 m. This accuracy is orders of magnitude better than conventional span-by-span isolation techniques.

Fiber Distance Vs. Geographical Distance

It is important to note that this distance is fiber distance, and would include any slack fiber, dispersion compensating fiber, changes in elevation, etc. and may not match geographical distance. However, this can be overcome as described herein, by matching fiber distance to the geographical distance through calibration. Thus, while knowing the fiber distance would seem to be all that is necessary to localize the transient source, there is still the issue of relating the fiber distance to actual physical location on the fiber link. Specifically, fiber distance and geographic distance will not be equal due to, for example, fiber slack storage, altitude changes, cable spiral, and the like. That is, the aforementioned items can contribute to modifying the relationship to geographic distance.

This leads to a problem statement—how to relate fiber distance-based localization measurements to a physical position in an actual network? With the in-service optical fault isolation process 50, there is a technique to localize transients. It can be observed that one could force generation of a transient in the field, at a known location, to determine fiber distance for that point. Thus, the systems and methods can include a so-called transient generation tool to act as a known transient source, at a known physical location. With the known transient source, the in-service optical fault isolation process 50 can be performed to provide actual fiber distance to a known physical location—this in turn can be used to correlate fiber distance to geographical distance. For example, as part of the in-service optical fault isolation process 50, a transient can be intentionally caused to correlate fiber distance-based localization measurements to a physical position of the one or more optical fibers.

In an exemplary embodiment, the transient generation tool can be an impact tool or an apparatus to deliver a controlled impact/magnetic field. The transient generation tool is configured to act on the fibers 16, 18, at corresponding breakout points where access to the fibers 16, 18 is available. The impact tool can be a manual, physical device, such as a hammer or mallet. Of course, a manual, physical device is not well controlled, leading to a risk of impacts to traffic if the transient is too fast/large. That is, the transient generation tool must not cause tracking concerns for in-service modems. Note, different fibers 16, 18 may have different sensitivity to impact. In an exemplary embodiment, the impact tool can have some form of firm attachment to the fibers 16, 18 to deliver a controlled force. The impact tool must be able to deliver multiple impacts with consistent force, portability is preferred, the impact tool cannot damage the fibers 16, 18.

The apparatus to deliver a controlled impact/magnetic field can use a coil around the fibers 16, 18 to generate a magnetic field impulse, using Faraday effect to cause a SOP transient on fibers 16, 18. In an exemplary embodiment, the apparatus can be realized via a manually wrapped coil with a few loops due to the challenge of keeping the fibers 16, 18 intact (no traffic disruption). In another exemplary embodiment, the apparatus can be a clamp-on coil. The apparatus, unlike the impact tool, does need electrical power and some kind of control unit to apply impulses. However, the apparatus has significantly less risk of damage to the fibers 16, 18 relative to the impact tool.

Exemplary Network Element/Node

Figure 3:
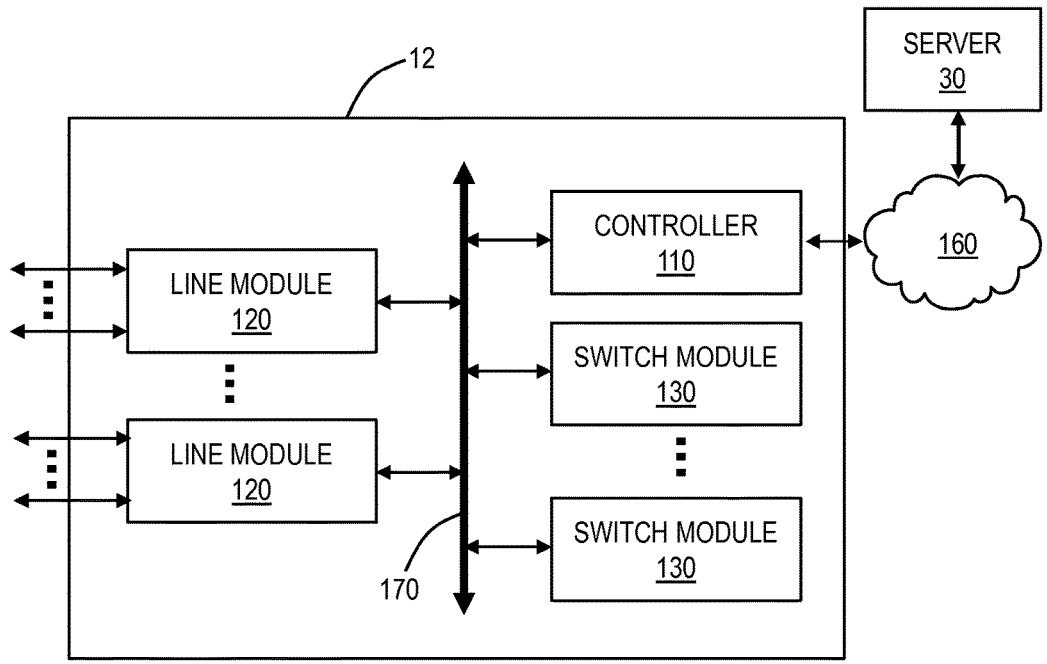
FIG. 3 is a block diagram of an exemplary node in the networks of FIGS. 1 and 2.

Referring to FIG. 3, in an exemplary embodiment, a block diagram illustrates an exemplary node 12 in the network 10. In an exemplary embodiment, the exemplary node 12 can be a network element that may consolidate the functionality of a Packet-Optical Transport System (POTS), Multi-Service Provisioning Platform (MSPP), Digital Cross Connect (DCS), Ethernet and/or Optical Transport Network (OTN) switch, Wave Division Multiplexed (WDM) platform, etc. into a single, high-capacity intelligent switching system providing Layer 0, 1, and/or 2 consolidation. In another exemplary embodiment, the node 12 can be any of an OTN Add/Drop Multiplexer (ADM), ROADM, OADM, an MSPP, a DCS, a POTS, an optical cross-connect, an optical switch, a router, a switch, a WDM/DWDM platform, an access/aggregation device, etc. That is, the node 12 can be a photonic and digital system. The digital system can include ingress and egress digital signals and switching of channels, timeslots, tributary units, etc., and the photonic system can include ingress and egress wavelengths and switching. While the node 12 is generally shown as an optical network element, the systems and methods contemplated for use with any switching fabric, network element, or network providing optical connectivity in the network 10.

In an exemplary embodiment, the node 12 includes a controller 110, one or more line modules 120, and one or more switch modules 130. The controller 110 can include OAM&P access; user interface ports; and the like. The controller 110 can connect to the server 30 acting as a management system through a data communication network 160. The management system 150 can include a network management system (NMS), element management system (EMS), SDN controller, PCE, or the like. Additionally, the controller 110 can be configured to operate a control plane and/or management plane. The node 110 can include an interface 170 for communicatively coupling the controller 110, the line modules 120, and the switch modules 130 together. For example, the interface 170 can be a backplane, midplane, a bus, optical or electrical connectors, or the like.

The line modules 120 are configured to provide ingress and egress to the switch modules 130 and to external connections forming digital connections on the links 120. From a logical perspective, the line modules 120 provide ingress and egress lines to the node 12, and each line module 120 can include one or more physical ports which form the lines. The line modules 120 can provide outputs at OTUk rates (k=2, 3, 4, Cn (n=1, 2, 3, . . . ) and different wavelengths. The switch modules 130 are configured to switch channels, wavelengths, timeslots, tributary units, packets, etc. between the line modules 120.

Those of ordinary skill in the art will recognize the node 12 can include other components which are omitted for illustration purposes, and that the systems and methods described herein is contemplated for use with a plurality of different network elements with the node 12 presented as an exemplary type of a network element. For example, in another exemplary embodiment, the node 12 may not include the switch modules 130, but rather have the corresponding functionality in the line modules 120 (or some equivalent) in a distributed fashion. Alternatively, for a DWDM, ROADM, OADM, etc., the node 12 may not include the switch modules 130 and corresponding functionality. Specifically, for a transponder/regenerator application, the node 12 may just include the line modules 120, facing client and line sides based on the application. For the node 12, other architectures providing ingress, egress, and switching between are also contemplated for the systems and methods described herein.

In an exemplary embodiment, the node 12A is configured to isolate an optical fault in-service on a link connected to a second node 12B. The node 12A includes a line port (e.g., on the line module 120); and a controller 110 communicatively coupled to the line port, wherein the controller 110 is configured to maintain a local counter and transmit associated values of the local counter to the second node 12B in a signal over the line port, detect an event 20 in a frame on the signal and determine a value of a remote counter in the frame over the line port, determine a value of the local counter when the frame is received over the line port, and one of i) receive a value of the local counter received by the second node 12B in the frame and determine a distance to the event 20 and ii) provide the value of the remote counter and the value of the local when the frame is received to an external device (e.g., the server 30) such that the external device determines the distance. The distance is determined based on converting time differences of counters into the distance, based on propagation speed of a signal over optical fiber forming the link. The frame can be an Optical Transport Network frame, and the associated values of the local counter are incremented for each frame. The location is determined in-service based on a single occurrence of the event without external equipment. The local counter is a counter CNT_A, and the remote counter is CNT_B, wherein the value of the local counter when the frame is received over the line port is M_A, wherein the value of the local counter received by the second node in the frame is N_A, with the value of M_A incremented by the maximum counter value+1 if M_A<N_A, and wherein a time T_A from the event to the node is (M_A−N_A)*Frame Time/2, providing resolution of the distance based on the Frame Time. For example, the Frame Time would be 1.17 µs for OTU4.

Exemplary Controller

Figure 4:
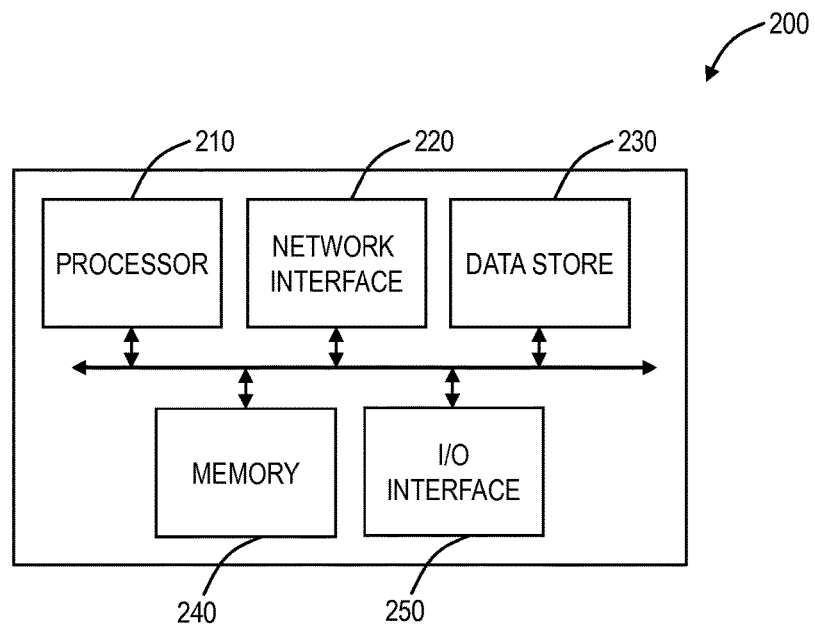

Referring to FIG. 4, in an exemplary embodiment, a block diagram illustrates an apparatus 200 which can be used for the server 30 in FIG. 1, the controller 110 in the node of FIG. 3, a Path Computation Element (PCE), a planning tool, or the like. The apparatus 200 can include a processor 210 which is a hardware device for executing software instructions and the like. The processor 210 can be any custom made or commercially available processor, a central processing unit (CPU), an auxiliary processor among several processors associated with the apparatus 200, a semiconductor-based microprocessor (in the form of a microchip or chip set), or generally any device for executing software instructions. When the apparatus 200 is in operation, the processor 210 is configured to execute software stored within memory, to communicate data to and from the memory, and to generally control operations of the apparatus 200 pursuant to the software instructions. The apparatus 200 can also include a network interface 220, a data store 230, memory 240, Input/Output (I/O) interfaces 250, and the like, all of which are communicatively coupled together.

The network interface 220 can be used to enable the apparatus 200 to communicate on a network, such as the DCN 160 or the like, such as to communicate control plane information to other controllers, to the server 30, to communicate SDN commands, and the like. That is, the network interface 220 can be used to communicate counter data from the nodes 12 along with other information for performing the systems and methods. The data store 230 can be used to store data, such as control plane information, provisioning data, OAM&P data, etc. The data store 230 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 230 can incorporate electronic, magnetic, optical, and/or other types of storage media. The memory 240 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 240 may incorporate electronic, magnetic, optical, and/or other types of storage media. Note that the memory 240 can have a distributed architecture, where various components are situated remotely from one another, but may be accessed by the processor 210. The I/O interface 250 includes components for the apparatus 200 communicate to communicate with other devices. Further, the I/O interface 250 includes components for the apparatus 200 to communicate with the other nodes 12, such as using General Communication Channel (GCC) overhead or the like.

In an exemplary embodiment, the apparatus 200 is configured to isolate an optical fault on a link between the nodes 12A, 12B. The apparatus 200 includes the network interface 220, the processor 210 communicatively coupled to the network interface 220; and memory 240 storing instructions that, when executed, cause the processor 210 to receive data via the network interface 220 related to counters maintained at each of the first node 12A and the second node 12B, wherein the data relates to values of the counters associated with an event 20 on the link, and determine a location on the link of the event 20 based the values of the counters. The location is determined based on converting time differences between the values into the distance, based on propagation speed of a signal over optical fiber forming the link. The counters can be provided in Optical Transport Network frames and incremented for each frame. The counters can include a bit resolution based on a maximum distance between the first node 12A and the second node 12B. The location is determined in-service based on a single occurrence of the event without external equipment based on the number of increments recorded by the counters. The counters include a counter CNT_A transmitted from the first node to the second node and a counter CNT_B transmitted from the second node to the first node, wherein the associated values are 1) N_A for the counter CNT_A when the event occurs, 2) N_B for the counter CNT_B when the even occur, 3) M_A for the counter CNT_A when the first node receives N_B for the counter CNT_B, and 4) M_B for the counter CNT_B when the second node receives N_A for the counter CNT_A. The final value of the counter M_A is incremented by the maximum counter value+1 if M_A<N_A, while the final value of the counter M_B is incremented by the maximum counter value+1 if M_B<N_B, and wherein a time T_A from the event to the first node is (M_A−N_A)*Frame Time/2 and a time T_B from the event to the second node is (M_B−N_B)*Frame Time/2. For example, the Frame Time would be 1.17 µs for OTU4.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for in-service optical fault isolation on a link between a first node and a second node, the method comprising:
   transmitting count information associated with counters between each of the first node and the second node;
   determining associated values for the counters responsive to an event associated with the link; and
   determining a location of the event based on the associated values for the counters;

wherein the counters comprise a counter CNT-A transmitted from the first node to the second node and a counter CNT-B transmitted from the second node to the first node, wherein the associated values are 1) N-A for the counter CNT-A when the event occurs, 2) N-B for the counter CNT-B when the even occur, 3) M-A for the counter CNT-A when the first node receives N-B for the counter CNT-B, and 4) M-B for the counter CNT-B when the second node receives N-A for the counter CNT-A and M-A and M-B are incremented by a maximum counter value+1 if they are less than their corresponding values N-A and N-B, and wherein a time T-A from the event to the first node is (M-A−N-A)*Frame-Time/2 and a time T-B from the event to the second node is (NI-B−N-B)*Frame-Time/2.

2. The method of claim 1, wherein the determining comprises converting time differences between the counters into distance, based on propagation speed of a signal over optical fiber forming the link.

3. The method of claim 1, wherein the counters are provided in Optical Transport Network frames and incremented for each frame.

4. The method of claim 1, wherein the counters comprise a number of bits based on a maximum distance between the first node and the second node.

5. The method of claim 1, wherein the location is determined in-service based on a single occurrence of the event without external equipment.

6. The method of claim 1, wherein the event is any of fiber cuts, fiber pinches, poor fiber splices, polarization transients, changes in optical power, change in Signal to Noise Ratio (SNR), and Bit Error Rate (BER) change.

7. The method of claim 1, wherein the method is performed by one of the first node and the second node, subsequent to providing the associated counters between the first node and the second node.

8. The method of claim 1, wherein the method is performed by a server, subsequent to providing the associated counters from the first node and the second node to the server.

9. An apparatus configured to isolate an optical fault on a link between a first node and a second node, the apparatus comprising:
  a network interface;
  a processor communicatively coupled to the network interface; and
  memory storing instructions that, when executed, cause the processor and the network interface to
    receive data via the network interface related to counters maintained at each of the first node and the second node, wherein the data relates to values of the counters associated with an event on the link, and
    determine a location on the link of the event based the values of the counters,
  wherein the counters comprise a counter CNT-A transmitted from the first node to the second node and a counter CNT-B transmitted from the second node to the first node,
  wherein the associated values are 1) N-A for the counter CNT-A when the event occurs, 2) N-B for the counter CNT-B when the even occur, 3) M-A for the counter CNT-A when the first node receives N-B for the counter CNT-B, and 4) M-B for the counter CNT-B when the second node receives N-A for the counter CNT-A and M-A and M-B are incremented by a maximum counter value+1 if they are less than their corresponding values N-A and N-B, and
  wherein a time T-A from the event to the first node is (M-A−N-A)*Frame-Time/2 and a time T-B from the event to the second node is (M-B−N-B)*Frame-Time/2.

10. The apparatus of claim 9, wherein the location is determined based on converting time differences between the values into distance, based on propagation speed of a signal over optical fiber forming the link.

11. The apparatus of claim 9, wherein the counters are provided in Optical Transport Network frames and incremented for each frame.

12. The apparatus of claim 9, wherein the counters comprise a number of bits based on a maximum distance between the first node and the second node.

13. The apparatus of claim 9, wherein the location is determined in-service based on a single occurrence of the event without external equipment.

14. A node configured to isolate an optical fault in-service on a link connected to a second node, the node comprising:
  a line port; and
  a controller communicatively coupled to the line port, wherein the controller is configured to
    maintain a local counter and transmit associated values of the local counter to the second node in a signal over the line port,
    detect an event in a frame on the signal and determine a value of a remote counter in the frame over the line port,
    determine a value of the local counter when the frame is received over the line port, and
    one of i) receive a value of the local counter of the second node in the frame and determine a distance to the event and ii) provide the value of the remote counter and the value of the local counter when the frame is received to an external device configured to determine the distance,
  wherein the local counter is a counter CNT-A and the remote counter is CNT-B,
  wherein the value of the local counter when the frame is received over the line port is M-A,
  wherein the value of the local counter received by the second node in the frame is N-A,
  wherein the value M-A by the maximum counter value+1 if M-A<N-A, and
  wherein a time T-A from the event to the node is (M-A−N-A)*Frame-Time/2, providing resolution of the distance based on the Frame-Time.

15. The node of claim 14, wherein the distance is determined based on converting time differences of counters into distance, based on propagation speed of a signal over optical fiber forming the link.

16. The node of claim 14, wherein the frame is an Optical Transport Network frame and the associated values of the local counter are incremented for each frame.

17. The node of claim 14, wherein the location is determined in-service based on a single occurrence of the event without external equipment.

* * * * *